US010259949B2

(12) United States Patent
Kreh et al.

(10) Patent No.: US 10,259,949 B2
(45) Date of Patent: Apr. 16, 2019

(54) CORROSION RESISTANT SPRAY APPLIED FIRE RESISTIVE MATERIALS

(71) Applicant: United States Mineral Products Company, Stanhope, NJ (US)

(72) Inventors: Robert Paul Kreh, Middle River, MD (US); Qinghua Li, Edison, NJ (US)

(73) Assignee: United States Mineral Products Company, Stanhope, NJ (US)

( * ) Notice: Subject to any disclaimer, the term of this patent is extended or adjusted under 35 U.S.C. 154(b) by 0 days.

(21) Appl. No.: 15/545,952

(22) PCT Filed: Jan. 25, 2016

(86) PCT No.: PCT/US2016/014701
§ 371 (c)(1),
(2) Date: Jul. 24, 2017

(87) PCT Pub. No.: WO2016/123010
PCT Pub. Date: Aug. 4, 2016

(65) Prior Publication Data
US 2018/0009994 A1   Jan. 11, 2018

Related U.S. Application Data

(60) Provisional application No. 62/107,687, filed on Jan. 26, 2015.

(51) Int. Cl.
| *C09D 5/08* | (2006.01) |
| *C04B 12/04* | (2006.01) |
| *C23F 11/12* | (2006.01) |
| *C04B 28/04* | (2006.01) |
| *C04B 28/06* | (2006.01) |
| *C04B 28/10* | (2006.01) |
| *C04B 28/14* | (2006.01) |
| *C04B 28/18* | (2006.01) |
| *C09D 1/08* | (2006.01) |
| *C09D 5/18* | (2006.01) |
| *C04B 14/04* | (2006.01) |
| *C04B 22/08* | (2006.01) |
| *C04B 24/04* | (2006.01) |
| *C04B 24/06* | (2006.01) |
| *C09D 1/06* | (2006.01) |
| *C04B 103/61* | (2006.01) |
| *C04B 111/00* | (2006.01) |
| *C04B 111/26* | (2006.01) |
| *C04B 111/28* | (2006.01) |

(52) U.S. Cl.
CPC ............. *C09D 5/086* (2013.01); *C04B 14/04* (2013.01); *C04B 14/045* (2013.01); *C04B 22/085* (2013.01); *C04B 24/04* (2013.01); *C04B 24/06* (2013.01); *C04B 28/04* (2013.01); *C04B 28/06* (2013.01); *C04B 28/10* (2013.01); *C04B 28/14* (2013.01); *C04B 28/18* (2013.01); *C09D 1/06* (2013.01); *C09D 1/08* (2013.01); *C09D 5/084* (2013.01); *C09D 5/18* (2013.01); *C23F 11/122* (2013.01); *C23F 11/124* (2013.01); *C04B 2103/61* (2013.01); *C04B 2111/00155* (2013.01); *C04B 2111/00525* (2013.01); *C04B 2111/00577* (2013.01); *C04B 2111/26* (2013.01); *C04B 2111/28* (2013.01)

(58) Field of Classification Search
CPC ......... C04B 28/04; C04B 28/06; C04B 28/10; C04B 28/14; C04B 28/18; C04B 14/04; C04B 14/045; C04B 22/085; C04B 24/04; C04B 24/06; C04B 2103/61; C04B 2111/00155; C04B 2111/26; C04B 2111/28; C04B 2111/00525; C04B 2111/00577; C09D 5/086; C09D 1/08; C09D 5/18; C09D 1/06; C09D 5/084; C23F 11/122; C23F 11/124
See application file for complete search history.

(56) References Cited

U.S. PATENT DOCUMENTS

| 4,277,355 | A | * | 7/1981 | Farcnik | ............ C04B 28/26 106/15.05 |
| 4,495,228 | A | | 1/1985 | Cornwell | |
| 5,250,578 | A | | 10/1993 | Cornwell | |
| 5,502,937 | A | * | 4/1996 | Wilson | ............ B32B 15/14 52/273 |
| 5,539,032 | A | * | 7/1996 | Hegedus | ............ C09D 5/08 427/385.5 |
| 5,597,514 | A | | 1/1997 | Miksic et al. | |
| 6,306,210 | B1 | | 10/2001 | Miksic et al. | |
| 6,780,230 | B2 | * | 8/2004 | Hilton | ............ B01F 5/0406 106/122 |
| 7,658,861 | B2 | | 1/2010 | Schafer et al. | |
| 2003/0125405 | A1 | | 7/2003 | Hilton et al. | |
| 2009/0020034 | A1 | * | 1/2009 | McConnell | ............ C23F 11/00 106/14.05 |

FOREIGN PATENT DOCUMENTS

| CN | 102850855 | A | * | 1/2013 | | |
| CN | 103274647 | A | * | 9/2013 | | |
| CN | 103387376 | A | * | 11/2013 | | |
| CN | 103570307 | A | * | 2/2014 | | |
| DE | 10305749 | A1 | * | 9/2004 | ............ | C09D 7/63 |
| JP | 04027506 | A | * | 1/1992 | | |
| JP | 06183854 | A | * | 7/1994 | ............ | C04B 38/00 |
| KR | 100786998 | B1 | * | 12/2007 | ............ | C04B 24/125 |

(Continued)

OTHER PUBLICATIONS

Akiyama et al., Journal of the Electrochemical Society, 117, 999, 1970.

(Continued)

*Primary Examiner* — Anthony J Green
(74) *Attorney, Agent, or Firm* — McCarter & English, LLP

(57) ABSTRACT

The present disclosure relates to corrosion resistant coating compositions, kits and methods of applying the same, for use as fireproofing materials. The corrosion resistant spray applied fire resistant material contains an organic corrosion inhibitors, such as an aldonic acid, benzoic acid, or combinations thereof, to reduce or eliminate corrosion of the underlying substrate.

15 Claims, No Drawings

(56) References Cited

FOREIGN PATENT DOCUMENTS

| KR | 101180054 B1 * | 9/2012 | |
|---|---|---|---|
| KR | 101370579 B1 * | 3/2014 | |
| RU | 2055821 C1 * | 3/1996 | ............ C04B 28/26 |
| WO | WO-2015144796 A1 * | 10/2015 | ............ C04B 28/06 |
| WO | WO 2016/123010 A1 | 8/2016 | |

OTHER PUBLICATIONS

PCT International Search Report and Written Opinion for PCT/US2016/014701 dated Mar. 10, 2016.
U.S. Appl. No. 62/107,687, filed Jan. 26, 2015.

\* cited by examiner

CORROSION RESISTANT SPRAY APPLIED FIRE RESISTIVE MATERIALS

FIELD OF THE TECHNOLOGY

The present disclosure relates to corrosion resistant coating compositions, kits and methods of applying the same, for use as fireproofing materials.

BACKGROUND

In the construction industry, structures can be coated with passive fireproofing material. Fireproofing material is known to provide fire resistance to substrates susceptible to fire, such as steel elements of buildings including beams, columns, roofs, decks, floors and plates and the like. These materials include spray applied fire resistant materials (SFRMs) which can be used for direct application to structural steel building members. They are predominantly cementitious or plaster-based. Their fire-resistive qualities and physical characteristics can vary widely between the respective types of SFRM. For example, the density of SFRMs are lower than normal weight concrete (e.g., 140-150+ lbs/ft$^3$) and light weight (e.g., 90-150 lbs/ft$^3$). Because SFRMs are made with ultra-light weight coarse aggregates, such as exfoliated vermiculite, mica, low density polystyrene etc., the materials are very porous. In-place density of the SFRMs is low (e.g., 15-60 lbs/ft$^3$).

SFRMs can consist of inorganic binders such as plaster or Portland cement, and various fillers such as vermiculite, mica, limestone, gypsum, lightweight polystyrene beads, mineral wool, glass fibers, ceramic fibers, aluminum ore, clay and quartz. Examples of Portland-cement-based fireproofing products are Fendolite® MII from Isolatek International, Pyrocrete® 241 from Carboline and Monokote® Type Z-146 from W. R. Grace. Examples of plaster-based fireproofing products are Cafco® 300 from Isolatek International, Pyrolite® 15 from Carboline and Monokote® MK-6 from W. R. Grace.

Corrosion of SFRM coated substrates can be a concern. Typically, SFRMs comprise alkaline materials, such as Portland cement, which minimize the corrosion of the underlying substrate. Yet, when SFRMs are applied directly to the structural steel, aggressive agents, such as chloride ion (Cl$^-$) or carbon dioxide ($CO_2$) present in the surrounding medium can penetrate, cause protective oxides on metal substrates to breakdown and lead to the corrosion of the steel substrate.

Corrosion inhibitors have been widely applied in normal weight and lightweight concrete for corrosion protection of metals contained within the concrete. There are numerous chemical compounds that exhibit inhibitive properties. Of these, however, only inorganic corrosion inhibitors have been commercially used for corrosion inhibition in a high density SFRMs. Calcium nitrite has been used with Monokote® Z-156T from W. R. Grace. Monolote Z-156T is a high density (>50 lbs/ft$^3$) cementitious fireproofing material for tunnels and severe environmental exposure.

Yet, organic corrosion inhibitors have not traditionally been used in SFRMs, in part due to the SFRM's alkaline nature, and in part due to the of lack of guidance and uncertainty in the industry. Although both SFRM and concrete contain significant amounts of Portland cement, the two classes of product commonly show different properties with respect to additives. Corrosion inhibitors used in concrete are not indicated for SFRMs due to the differences in application, requirements and different effects of common additives. Concrete is normally applied by precasting or casting in place. SFRMs are normally applied by spraying onto structural steel members through a hose under 30-80 psi air pressure. To be effective the SFRM requires good pumpability, good hangability and strong adhesion on the substrate.

Moreover, the effect of different additives in both concrete and SFRMs are not similar. For example, the addition of a superplasticizer in concrete allows for the use of less water and increases the concrete's physical strength. The use of a superplasticizer in a SFRM results in a decrease in the SFRM's physical strength. Similarly, the use of a shrinkage reducing agent reduces shrinkage in concrete but does not in a SFRM. The use of silica fume fillers in concrete produces increased physical strength. In a SFRM silica fume fillers also increase physical strength. But, they also significantly reduce set time (resulting in problems with pump-ability and spray-ability), reduce adhesion (to the point of delamination) and increase shrinkage (which can lead to cracking). Finally, the use of Class C fly ash in concrete reduces shrinkage and increases physical strength. In a SFRM, however, Class C fly ash increases shrinkage and reduces adhesion (to the point of delamination).

The present disclosure is directed to a spray applied fire resistant material having organic corrosion inhibitors, such as an aldonic acid or a salt thereof or a benzoic acid or a salt thereof, to reduce or eliminate corrosion of the SFRM coated substrate.

SUMMARY

The present disclosure relates to corrosion resistant coating compositions, kits and methods of applying the same, for use as fireproofing materials.

In one embodiment, the present disclosure relates to a fireproofing composition having a binder, such as Portland cement or plaster, a filler, such as exfoliated vermiculite, exfoliated perlite, mica, low density polystyrene etc., and at least one organic corrosion inhibitor, such as an aldonic acid or a salt thereof, a benzoic acid or a salt thereof, or combinations thereof. The composition can also contain an alkali silicate.

The use of one or more organic corrosion inhibitors in the fireproofing composition can reduce the corrosion rate and increase the physical strength of the composition, such as fireproofing materials like Fendolite® M-II and M-II/P. For example, the fireproofing composition can be stronger by about 10% as compared to a similar fireproofing not containing an organic corrosion inhibitor. The use of one or more organic corrosion inhibitors in the fireproofing composition also does not substantially affect the original set time of the composition. For example, the fireproofing composition can have a set time no than about 50% greater than the set time of a similar composition not containing an organic corrosion inhibitor.

The present disclosure also relates to an article having a metal substrate and a coating composition as provided above on the metal substrate. The article can experience corrosion of the metal substrate decreased by about 10% or greater, as compared to a similar composition not containing an organic corrosion inhibitor.

DETAILED DESCRIPTION

The present disclosure relates to corrosion resistant coating compositions, kits and methods of applying the same, for use as fireproofing materials. In particular, it has been discovered that the use of organic corrosion inhibitors, such as aldonic acid and/or benzoic acid chemicals, can reduce the corrosion rate of a substrate underlying a SFRM, such as steel members coated with Fendolite® M-II and M-II/P materials. These inhibitors can reduce corrosion while maintaining the original set time of the SFRM. They can also increase the physical strength of the SFRM.

In one embodiment, the present disclosure relates to a fireproofing composition comprising a binder, a filler, at least one organic corrosion inhibitor selected from an aldonic acid or a salt thereof, a benzoic acid or a salt thereof, or a combination thereof. The choice of binder can be any known binder for use in a fireproofing material or a SFRM. In particular, the binder can be selected from Portland cement, which is a mixture of various calcium-aluminum silicates, Pozzolanas, which can be a natural or artificial material containing silica in a reactive from, such as volcanic ash, calcined clay, fly ash, silica fume, rice ash etc., Pozzolanic cement, which a mixture of Portland cement and pozzolanic materials, quicklime or hydrated lime, Gypsum plaster and calcium aluminate cement.

The amount of binder in the fireproofing composition can vary depending on the substrate, the level of protection needed and other similar factors. The amount of binder in the fireproofing composition can be greater than about 20%, 25%, 30%, 35%, 40%, 45%, 50%, 55%, 60%, 65%, 70%, 75% or about 80% by weight. These values can also define a range of binder in the composition, such as from about 40% to about 70%.

The choice of filler can be any known filler for use in a fireproofing material or a SFRM. In particular, the filler can be selected from silica, diatomaceous earth, alumina, zinc oxide, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, gypsum fiber, a potassium salt such as calcium silicate, etc., vermiculite, kaolin, mica, talc, clay, mica, montmorillonite, bentonite, activated clay, sepiolite, imogolite, sericite, glass fiber, glass beads, ceramic beads, silica series balloon, aluminum nitride, boron nitride, silicon nitride, carbon black, graphite, carbon fiber, carbon balloon, charcoal powder, various kinds of metal powder, potassium titanate, magnesium sulfate, lead zirconate titanate, aluminum borate, molybdenum sulfide, silicon carbide, stainless fiber, zinc borate, various kinds of magnetic powder, slug fiber, fly ash, inorganic series phosphorus compound, silica-alumina fiber, alumina fiber, silica fiber, and zirconia fiber.

The amount of filler in the fireproofing composition can vary depending on the substrate, the level of protection needed and other similar factors. The amount of filler in the fireproofing composition can be greater than about 10%, 20%, 25%, 30%, 35%, 40%, 45%, 50%, 55%, 60%, 65%, 70%, 75% or about 80% by weight. These values can also define a range of filler in the composition, such as from about 35% to about 70%.

Corrosion protection in a SFRM is provided, in part, by the at least one organic corrosion inhibitor in the fireproofing composition. In one embodiment, the organic corrosion inhibitor is an aldonic acid or a salt thereof, a benzoic acid or a salt thereof, or a combination thereof. Aldonic acids and their salts (e.g., Na, K, Zn, Ammonium, etc.) are known corrosion inhibitors. U.S. Pat. No. 7,658,861, the disclosure of which is hereby incorporated in its entirety, describes the use of aldonic acids as corrosion inhibitors in deicing compositions. This class of acids has the general chemical formula $CH_2OH(CHOH)_nCO_2H$, wherein n=2-6. Examples of aldonic acids include, but are not limited to, erythronic acid, gluconic acid and glucoheptonic acid. Without wishing to be bound, it is believed that aldonic acid reduces corrosion by being an anodic inhibitor. Due to their ability to interact with oxidized iron aldonic acids promote a passive surface where further oxidation is decreased.

The amount of aldonic acid in the fireproofing composition can vary depending on the substrate, the level of protection needed and other similar factors. The amount of aldonic acid in the fireproofing composition can be greater than about 0.001%, 0.002%, 0.005%, 0.010%, 0.025%, 0.050%, 0.075%, 0.1%, 0.2%, 0.3%, 0.4%, 0.5%, 0.6%, 0.7%, 0.8%, 0.9% or about 1.0% by weight. These values can also define a range of aldonic acid in the composition, such as from about 0.03% to about 0.3%.

Benzoic acids and their salts (e.g., Na, K, Zn, Ammonium, etc.) are also known corrosion inhibitors. See A. Akiyama and K. Nobe, J. Electrochem. Soc., 117, 999 (1970). This class of acids has the general chemical formula $(R)_nC_6H_{(5-n)}CO_2H$, wherein n=0-5. Examples are benzoic acids include, but are not limited to, aminobenzoic acid and hydroxybenzoic acid. Without wishing to be bound, it is believed that benzoic acid also reduces corrosion by being an anodic inhibitor.

The amount of benzoic acid in the fireproofing composition can vary depending on the substrate, the level of protection needed and other similar factors. The amount of benzoic acid in the fireproofing composition can be greater than about 0.0005%, 0.001%, 0.002%, 0.005%, 0.010%, 0.025%, 0.050%, 0.075%, 0.1%, 0.2%, 0.3%, 0.4%, 0.5%, 0.6%, 0.7%, 0.8%, 0.9% or about 1.0% by weight. These values can also define a range of benzoic acid in the composition, such as from about 0.03% to about 0.3%.

It should be noted that U.S. Pat. No. 6,306,210, the disclosure of which is hereby incorporated in its entirety, describes the use of sodium gluconate and ammonium benzoate as anticorrosive agents in concrete. These anticorrosive agents do not affect the inherent strength of the concrete but rather leave is virtually unaltered.

The fireproofing composition can also contain an alkali silicate or amorphous silica. In some embodiments, the fireproofing composition contains a binder, a filler and an alkali silicate or amorphous silica. These composition can further contain an aldonic acid or a benzoic acid. Alkali silicates (Na, K, or Li) are known to react with calcium hydroxide that is present in Portland cement to produce insoluble calcium silicates. It is believed that calcium silicate acts as the carrier, or adsorbent, for the corrosion inhibitors. Silicates are also used as hardeners for set Portland cement. Without wishing to be bound, it is believed that alkali silicate or amorphous silica contributes to the increased strength of the fireproofing composition of the present disclosure.

The amount of alkali silicate or amorphous silica in the fireproofing composition can vary depending on the substrate, the level of protection needed and other similar factors. The amount of alkali silicate or amorphous silica in the fireproofing composition can be greater than about 0.0005%, 0.001%, 0.002%, 0.005%, 0.010%, 0.025%, 0.050%, 0.075%, 0.1%, 0.2%, 0.3%, 0.4%, 0.5%, 0.6%, 0.7%, 0.8%, 0.9% or about 1.0% by weight. These values can also define a range of alkali silicate or amorphous silica in the composition, such as from about 0.06% to about 0.6%.

In some embodiments, the fireproofing composition contains an aldonic acid, a benzoic acid and an alkali silicate or amorphous silica. The amount of each of these components relative to each other can range from about 20% to about 70% aldonic acid, about 10% to about 50% benzoic acid and about 20% to about 60% alkali silicate or amorphous silica. Commercially products containing one or more of these components is known. MCI®-2006 and MCI®-2006 NS, available from Cortec Corporation, contains one or more of these components. The fireproofing composition of the present disclosure can contain MCI®-2006 or MCI®-2006 NS. The fireproofing composition can contain from about 0.01% to about 1.0% of this combination of components, as provided above or as available as a commercial product, such as MCI®-2006 and MCI®-2006 NS. In particular, the fireproofing composition can contain from about 0.05% to about 0.5%, or from about 0.1% to about 0.3%, of this combination of components.

The fireproofing composition can have a low density, such as a density lower than concrete. The fireproofing composition can have a density of less than about 90, 85, 80, 75, 70, 65, 60, 55, 50, 45, 40, 35, 30, 25 or about 20 pcf as determined by ASTM E605. These values can also define a range, such as between about 40 and about 80 pcf.

Fireproofing compositions are typically supplied as dry mixture. They are formed into slurries upon the addition of an appropriate amount of water prior to application. The time between preparation and application may span many hours. Thus, the setting time or set time of the mixture is important. In most embodiments, it is desired to achieve a quick setting time of the composition upon spray application to provide body to the fireproofing. If the mixture were to stiffen substantially in the mixer, it would be rendered non-pumpable and therefore would be useless for the intended application. If the mixture were to not stiffen substantially upon application, it would also be rendered useless for the intended application.

The use of the corrosion inhibitors of the present disclosure does not substantially or negatively affect the set time of the fireproofing composition. The set time of the fireproofing composition can be greater than about 10, 15, 20, 25, 30, 35 or 40 minutes as measured by using a 200 g cylindrical steel plug with a 1 inch diameter×½ inch thick foot. The set time can also be less than about 180, 170, 160, 140, 150, 130, 120, 110, 100, 90, 80, 70, 60 or about 50 minutes. This values can also be used to define a range, such as between about 30 and about 60 minutes. The set time of the fireproofing composition is less than about 50% different (i.e., either lesser or greater) than the set time of a similar composition not containing an organic corrosion inhibitor of the present disclosure. In other embodiments, the set time of the fireproofing composition is less than about 40%, 35%, 30%, 25%, 20%, 15%, 10%, 5%, 2% or 1% different than the set time of a similar composition not containing the organic corrosion inhibitor of the present disclosure. These values can also define a range, such as a set time from less than about 10% greater to less than about 15% less than compared to a composition without the inhibitor of the present disclosure.

Similarly, the pot time of the fireproofing composition is less than about 50% different (i.e., either lesser or greater) than the pot time of a similar composition not containing the organic corrosion inhibitor of the present disclosure. In other embodiments, the pot time of the fireproofing composition is less than about 40%, 35%, 30%, 25%, 20%, 15%, 10%, 5%, 2% or 1% different than the pot time of a similar composition not containing the organic corrosion inhibitor of the present disclosure. These values can also define a range, such as a pot time from less than about 15% greater to less than about 20% less than compared to a composition without the inhibitor of the present disclosure.

The use of the corrosion inhibitor of the present disclosure has been found to substantially improve the strength (e.g., compression strength) of the fireproofing composition. The compression strength of a fireproofing composition is a measure of physical performance. The compression strength of the fireproofing composition is greater than about 40,000 or 45,000 or 50,000, or 55,000 or 60,000, or 65,000 or 70,000 or 75,000 or about 80,000 psf when tested in accordance with ASTM E761. In some embodiments, the compression strength of the fireproofing composition is about 2% greater than the compression strength of a similar composition not containing the organic corrosion inhibitor of the present disclosure. In other embodiments, the compression strength of the fireproofing composition is about 3%, 4%, 5%, 6%, 7%, 8%, 9%, 10%, 11%, 12%, 13%, 14%, 15%, 16%, 17%, 18%, 19% or about 20% greater than the compression strength of a similar composition not containing the organic corrosion inhibitor of the present disclosure. These values can also define a range, such as an increase in compression strength from about 5% to about 15%.

In another embodiment, the present disclosure relates to an article comprising a metal substrate, and a fireproofing composition as provided herein on the metal substrate. The metal substrate can include beams, columns, roofs, decks, floors and plates and the like The use of the corrosion inhibitor of the present disclosure has been found to substantially reduce the corrosion of the underlying substrate. Corrosion is a measure of durability. In some embodiments, the fireproofing composition has a corrosion resistance wherein the fireproofing does not show evidence of corrosion when tested in accordance with ASTM E937. The extend of corrosion can also be measured by conducting cyclic potentiodynamic polarization following ASTM G61. In embodiment, the fireproofing coated substrate passes the ASTM G61 test. In a further embodiment, the substrate or article has sufficient corrosion resistance such that it corrodes less than about 1.3 mpy (milli inches per year), 1.2, 1.1, 1.0, 0.9, 0.8, 0.7, 0.6 or 0.5 mpy when tested in accordance with ASTM G 5-87.

In some embodiments, the article coated with the fireproofing composition of the present disclosure experiences a decrease in corrosion of about 2%, 3%, 4%, 5%, 6%, 7%, 8%, 9%, 10%, 11%, 12%, 13%, 14%, 15%, 16%, 17%, 18%, 19%, 20%, 25%, 30%, 40%, 50%, 60%, 70% or about 80% as compared to a similar composition not containing an organic corrosion inhibitor when tested in accordance with ASTM G61.

In another embodiment, the present disclosure relates to a method of producing a fireproofing composition, the method including forming a slurry comprising a binder, a filler, at least one organic corrosion inhibitor selected from an aldonic acid or a salt thereof, a benzoic acid or a salt thereof, or combinations thereof, and water; conveying the slurry to a length of hose which is typically less than about 500 feet; introducing an amount of gas (e.g., air) into said slurry in said length of hose at a flow rate and pressure sufficient to cause said slurry to foam and to convey said foam through said length of hose. The method can also include spray applying the foam to a substrate and allowing it to harden on the substrate.

In another embodiment, the present disclosure relates to a method of reducing corrosion of a metal containing substrate, the method including providing a metal containing substrate, and coating the substrate with a fireproofing composition comprising a binder, a filler, at least one organic corrosion inhibitor selected from an aldonic acid or a salt thereof, a benzoic acid or a salt thereof, or combinations thereof to form a fireproofing coated metal containing substrate. The corrosion of the fireproofing coated metal containing substrate can be decreased by at least about 10% as compared to a similar composition not containing an organic corrosion inhibitor. The strength of the fireproofing coated metal containing substrate can also be increased by at least about 10% as compared to a similar fireproofing not containing an organic corrosion inhibitor.

The disclosures of all cited references including ASTM methods, publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

EXAMPLES

Example 1

Fendolite® M-II samples were prepared by mixing 1000 grams of Fendolite® MII and 860 grams of water in a 4.5 QT Stand Mixer. One Fendolite® M-II sample contained 1.0 wt % calcium nitrite as a corrosion inhibitor. A second Fendolite® M-II sample contained 0.2 wt % MCI®-2006 as a corrosion inhibitor. Control sample of Fendolite® M-II was also prepared without corrosion inhibitors. The effects of these corrosion inhibitor on the set time of the samples were measured. The set time of the sample slurry was measured by using a 200 g cylindrical steel plug with a 1 inch diameter×½ inch thick foot. The set time of the control sample is 45 minutes. The addition of MCI®-2006 did not affect the set time of the Fendolite® M-II samples as they had a set time of about 44 minutes. While the addition of calcium nitrite greatly reduces the set time of Fendolite® M-II from 45 minutes to 9 minutes, making the slurry not flow-able and pump-able, such that the Fendolite® M-II could not be applied.

Example 2

Spray applied fire resistant materials were prepared containing organic corrosion inhibitors and tested for corrosion resistance. 1000 grams of Fendolite® MII mixture and 860 grams of water were added to a 4.5 QT Stand Mixer. The mixture was stirred for 3 minutes with a speed of 40 rpm. The slurry was used for the preparation of Fendolite® MII "Lollypop" specimens (used as the MII control).

A first sample was prepared by adding 1.0 gram of MCI®-2006 NS powder, available from Cortec Corp., and 860 grams of water added to a 4.5 QT Stand Mixer. The mixture was stirred until the MCI®-2006 NS powder was fully dissolved. 1000 grams of Fendolite® MII mixture was then added to the solution and mixed for 3 minutes with a speed of 40 rpm. The slurry was used to prepare MCI®-2006 NS plus Fendolite® MII "Lollypop" specimens (mixture "MCI1.0-MII").

A second sample was prepared by adding 2.0 grams of MCI®-2006 NS powder and 860 grams of water to a 4.5 QT Stand Mixer. The mixture was stirred until the MCI®-2006 NS powder was fully dissolved. 1000 grams of Fendolite® MII mixture was then added to the solution and mixed for 3 minutes with a speed of 40 rpm. The slurry was used to prepare MCI®-2006 NS plus Fendolite® MII "Lollypop" specimens (mixture "MCI2.0-MII").

Two samples each of MII control, MCI1.0-MII and MCI2.0-MII "Lollypop" specimens were prepared for electrochemical impedance testing following Cortec Corporation Work Instruction for "Concrete Sample Preparation." The sample dimensions were 2.6" bottom and 3.0" top diameters by 3.8" tall. The rebar used in this test is #3 reinforcing bar. The set time of all three preparation was also observed.

The "Lollypop" samples were cured and dried at ambient condition for 60 days before taking the Polarization resistance measurements. ASTM G 5-87 Standard Test Method was used. Table 2 lists the test results. It is clear that the addition of 0.1-0.2 wt % of MCI®-2006 NS into the Fendolite® MII mixture provided 56-80% increased corrosion protection.

TABLE 1

Corrosion Test Results

| Sample ID | Set Time | Corr. rate, mpy, Sample 1 | Corr. rate, mpy Sample 2 | Corr. rate, mpy Ave | % of corrosion protection |
|---|---|---|---|---|---|
| MII control | 43 min | 1.39 | 1.95 | 1.67 | control |
| MCI1.0-MII | 45 min | 0.72 | 0.75 | 0.74 | 56 |
| MCI2.0-MII | 44 min | 0.04 | 0.61 | 0.33 | 80 |

Example 3

Spray applied fire resistant materials were prepared containing organic corrosion inhibitors and tested for compression strength. 95.3 gram of MCI®-2006 NS, was first mixed with 50 lbs of Fendolite® MII using a drum mixer. 5 gallons of water was added into the mixture and mixed for 3 minutes with a speed of 40 rpm by using a stone mixer. The slurry was sprayed into 12"×12"×1" frame following Fendolite® MII application instructions. The sprayed Fendolite® MII samples were cured and dried at ambient condition for 28 days, then the compressive strength was measured by using a Com-Ten Compression Machine. Four data points were collected from each sample to obtain an average value. SFRM prepared without organic corrosion inhibitors were used as a control. The set time of both SFRM preparations was observed as 43 minutes for M2 and 44 minutes for M2-2006 N S. The use of an organic corrosion inhibitor does not substantially affect the set time. Table 1 lists the compressive strength of Fendolite® MII (control) and MCI®-2006 NS added Fendolite® MII. It is clear that the addition of MCI®-2006 NS (0.3 wt %) in Fendolite® MII mixture improves the compressive strength of final product. It was unexpected and surprising that the presence of these inhibitors result in higher strength of the cured SFRM.

TABLE 2

Compression Strength Test Results

| Sample ID | Test | Force (lbs) | Strength (psf) | Avg. Strength (psf) | Standard Deviation (psf) | Avg. Strength (psi) | Standard Deviation (psi) |
|---|---|---|---|---|---|---|---|
| M2 | 1 | 1770 | 63720 | 64422 | 2110.12 | 446.35 | 14.65 |
|  | 2 | 1826 | 65736 |  |  |  |  |
|  | 3 | 1846 | 66456 |  |  |  |  |
|  | 4 | 1716 | 61776 |  |  |  |  |
| M2-2006NS (0.3 wt %) | 1 | 2078 | 74808 | 72873 | 3398.32 | 506.03 (13% increase) | 23.60 |
|  | 2 | 2122 | 76392 |  |  |  |  |
|  | 3 | 1986 | 71496 |  |  |  |  |
|  | 4 | 1911 | 68796 |  |  |  |  |

While this disclosure has been particularly shown and described with reference to example embodiments thereof, it will be understood by those skilled in the art that various changes in form and details may be made therein without departing from the scope of the invention encompassed by the appended claims.

We claim:

1. A fireproofing composition comprising:
   (i) a binder selected from the group consisting of portland cement, pozzolanas, pozzolanic cement, quicklime, plaster and calcium aluminate cement, wherein the binder is between 40 and 70 wt. % of the fireproofing composition,
   (ii) a filler, wherein the filler is between 35 and 70 wt. % of the fireproofing composition, and
   (iii) at least one organic corrosion inhibitor selected from an aldonic acid or a salt thereof, a benzoic acid or a salt thereof, or combinations thereof, wherein the at least one organic corrosion inhibitor is between 0.03 and 0.3 wt. % of the fireproofing composition, and
   wherein the fireproofing composition has a density between 40 and 80 pounds per cubic foot.

2. The fireproofing composition of claim 1 wherein the filler is selected from the group consisting of silica, alumina, zinc oxide, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, gypsum fiber, potassium salt, calcium silicate, vermiculite, kaolin, mica, talc, clay, montmorillonite, bentonite, activated clay, sepiolite, imogolite, sericite, glass fiber, glass beads, ceramic beads, silica series balloon, aluminum nitride, boron nitride, silicon nitride, carbon black, graphite, carbon fiber, carbon balloon, charcoal powder, metal powder, potassium titanate, magnesium sulfate, lead zirconate titanate, aluminum borate, molybdenum sulfide, silicon carbide, stainless fiber, zinc borate, magnetic powder, inorganic series phosphorus compound, silica-alumina fiber, alumina fiber, silica fiber, and zirconia fiber.

3. The fireproofing composition of claim 1 comprising both an aldonic acid or a salt thereof and a benzoic acid or a salt thereof.

4. The fireproofing composition of claim 1 further comprising an alkali silicate.

5. The fireproofing composition of claim 1 wherein the set time is less than about 50% greater than the set time of a similar composition not containing an organic corrosion inhibitor.

6. The fireproofing composition of claim 1 wherein the strength of the fireproofing is increased by at least about 5% as compared to a similar fireproofing not containing an organic corrosion inhibitor.

7. An article comprising:
   (i) a metal substrate, and
   (ii) a coating composition of claim 1 on the metal substrate.

8. The article of claim 7 wherein the corrosion of the metal substrate is decreased by at least about 10% as compared to a similar composition not containing an organic corrosion inhibitor.

9. A method of producing a fireproofing composition, the method comprising:
   (i) forming a slurry with a coating composition of claim 1 and water;
   (ii) conveying the slurry to a length of hose;
   (iii) introducing an amount of gas into the slurry in the length of hose at a flow rate and pressure sufficient to cause the slurry to foam and to convey the foam through the length of hose.

10. The method of claim 9, further comprising spray applying the foam to a substrate and allowing it to harden on the substrate.

11. A method of reducing corrosion of a metal containing substrate, the method comprising:
    (i) providing a metal containing substrate;
    (ii) coating the substrate with a fireproofing composition of claim 1.

12. The method of claim 11, wherein the corrosion of the fireproofing coated metal containing substrate is decreased by at least about 10% as compared to a similar composition not containing an organic corrosion inhibitor.

13. The method of claim 11, wherein the strength of the fireproofing coated metal containing substrate is increased by at least about 5% as compared to a similar fireproofing not containing an organic corrosion inhibitor.

14. A fireproofing composition comprising:
    (i) a binder, which is selected from the group consisting of portland cement, pozzolanas, pozzolanic cement, quicklime, plaster and calcium aluminate cement,
    (ii) a filler, and
    (iii) an alkali silicate,
    wherein the quantity of alkali silicate is between 0.06 and 0.6 wt. %, and
    wherein the composition has a density between 40 and 80 pounds per cubic foot.

15. The fireproofing composition of claim 14, further comprising at least one organic corrosion inhibitor selected from an aldonic acid or a salt thereof, or a benzoic acid or a salt thereof.

* * * * *